(12) United States Patent
Yan et al.

(10) Patent No.: US 9,781,793 B2
(45) Date of Patent: Oct. 3, 2017

(54) CONTROLLING BRIGHTNESS AND COLOR TEMPERATURE OF LIGHT SOURCES

(71) Applicant: O2Micro Inc., Santa Clara, CA (US)

(72) Inventors: Tiesheng Yan, Sichuan (CN); Ching-Chuan Kuo, Taipei (TW); Ying-Chieh Su, Xizhi (Sijhih) District (TW)

(73) Assignee: O2Micro, Inc., Santa Clara, CA (US)

( * ) Notice: Subject to any disclaimer, the term of this patent is extended or adjusted under 35 U.S.C. 154(b) by 59 days.

(21) Appl. No.: 14/954,613

(22) Filed: Nov. 30, 2015

(65) Prior Publication Data

US 2016/0088697 A1 Mar. 24, 2016

Related U.S. Application Data

(63) Continuation-in-part of application No. 14/096,892, filed on Dec. 4, 2013, now Pat. No. 9,386,653, which is a continuation-in-part of application No. 13/559,451, filed on Jul. 26, 2012, now Pat. No. 9,232,591, which is a continuation-in-part of application No. 13/100,434, filed on May 4, 2011, now Pat. No. 8,339,067, which is a continuation-in-part of application No. 12/415,028, filed on Mar. 31, 2009, now Pat. No. 8,076,867, which is a continuation-in-part of application No. 12/316,480, filed on Dec. 12, 2008, now Pat. No. 8,044,608.

(30) Foreign Application Priority Data

Dec. 4, 2014 (CN) .......................... 2014 1 0729730

(51) Int. Cl.
H05B 37/02 (2006.01)
H05B 33/08 (2006.01)

(52) U.S. Cl.
CPC ..... *H05B 33/0842* (2013.01); *H05B 33/0815* (2013.01); *H05B 33/0818* (2013.01); *H05B 33/0827* (2013.01); *H05B 33/0845* (2013.01); *H05B 33/0848* (2013.01); *H05B 33/0857* (2013.01); *Y02B 20/346* (2013.01)

(58) Field of Classification Search
CPC ............ H05B 33/0842; H05B 33/0815; H05B 33/0818; H05B 33/0827; H05B 33/0845; H05B 33/0848; H05B 33/0857; Y02B 20/346
USPC ........................................ 315/307, 210, 201
See application file for complete search history.

(56) References Cited

U.S. PATENT DOCUMENTS

| 9,119,252 B2* | 8/2015 | Wu | ................... H05B 41/3924 |
| 2013/0043801 A1* | 2/2013 | Kuwu | ................ H05B 33/0863 315/210 |

* cited by examiner

Primary Examiner — Daniel D Chang

(57) ABSTRACT

A circuit for driving a light source includes a power converter coupled between a power source and the light source, and a controller coupled to the power converter. The power converter receives power from the power source and provides a regulated power to the light source. The controller receives a conduction status signal indicating a conduction state of a dimmer coupled between the power source and the power converter, and adjusts the brightness of the light source based on the conduction status signal. The controller also receives an operation indicating signal indicative of operation of an ON/OFF switch coupled to the dimmer, and adjusts color temperature of the light source based on the operation indicating signal.

18 Claims, 11 Drawing Sheets

CONTROLLING BRIGHTNESS AND COLOR TEMPERATURE OF LIGHT SOURCES

RELATED APPLICATIONS

The present application claims priority to Chinese Patent Application No. 201410729730.5, filed on Dec. 4, 2014, with the State Intellectual Property Office of the People's Republic of China, and the present application is also a continuation-in-part of the co-pending U.S. patent application Ser. No. 14/096,892, filed on Dec. 4, 2013, entitled "Circuits and Methods for Driving Light Sources," which itself is also a continuation-in-part of the co-pending U.S. patent application Ser. No. 13/559,451, filed on Jul. 26, 2012, entitled "Circuits and Methods for Driving Light Sources," which itself is a continuation-in-part of the U.S. patent application Ser. No. 13/100,434, filed on May 4, 2011, entitled "Circuits and Methods for Driving Light Sources" (now U.S. Pat. No. 8,339,067), which itself is a continuation-in-part of the U.S. patent application Ser. No. 12/415,028, filed on Mar. 31, 2009, entitled "Driving Circuit with Continuous Dimming Function for Driving Light Sources" (now U.S. Pat. No. 8,076,867), which itself is a continuation-in-part of the U.S. patent application Ser. No. 12/316,480, filed on Dec. 12, 2008, entitled "Driving Circuit with Dimming Controller for Driving Light Sources" (now U.S. Pat. No. 8,044,608), and all of which are fully incorporated herein by reference.

BACKGROUND

In recent years, light sources such as light-emitting diodes (LEDs) have been improved through technological advances in material and manufacturing processes. An LED possesses relatively high efficiency, long life, and vivid colors, and can be used in a variety of industries including the automotive, computer, telecom, military and consumer goods industries, etc. One example is an LED lamp which uses LEDs to replace traditional light sources such as electrical filaments.

There are some conventional ways to regulate the light sources. For example, a power converter receives an AC voltage from a power source, and generates a DC voltage to power the LED light source. A controller regulates an output of the power converter according to a dimmer coupled between the AC power source and the power converter to regulate the brightness of the LED light source. Conventional dimmers include TRIAC (Triode Alternating Current) dimmers and ON/OFF dimmers. However, these dimmers can only adjust the brightness of the light sources but cannot adjust the color temperature of the light sources.

SUMMARY

In one embodiment, a circuit for driving a light source includes a power converter coupled between a power source and the light source, and a controller coupled to the power converter. The power converter can receive power from the power source and provide a regulated power to the light source. The controller can receive a conduction status signal indicating a conduction state of a dimmer coupled between the power source and the power converter, and can adjust the brightness of the light source based on the conduction status signal. The controller can also receive an operation indicating signal indicative of operation of an ON/OFF switch coupled to the dimmer, and can adjust color temperature of the light source based on the operation indicating signal.

In another embodiment, a controller for controlling color temperature of a light source includes a signal generator, a dimmer monitoring unit, a driver, and a color temperature control unit. The signal generator can generate a monitoring signal proportional to an output current flowing through the light source. The dimmer monitoring unit can receive a conduction status signal indicative of a conduction state of a dimmer coupled between a power source and a power converter, and generates a reference signal indicative of a target level for the output current flowing through the light source based on the conduction status signal. The driver is coupled to the signal generator and the dimmer monitoring unit and can generate a driving signal based on the monitoring signal and the reference signal to control the power converter to provide a regulated power to the light source. The color temperature control unit can receive an operation indicating signal indicative of operation of an ON/OFF switch coupled to the dimmer, and can adjust the color temperature of the light source based on the operation indicating signal.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1A:
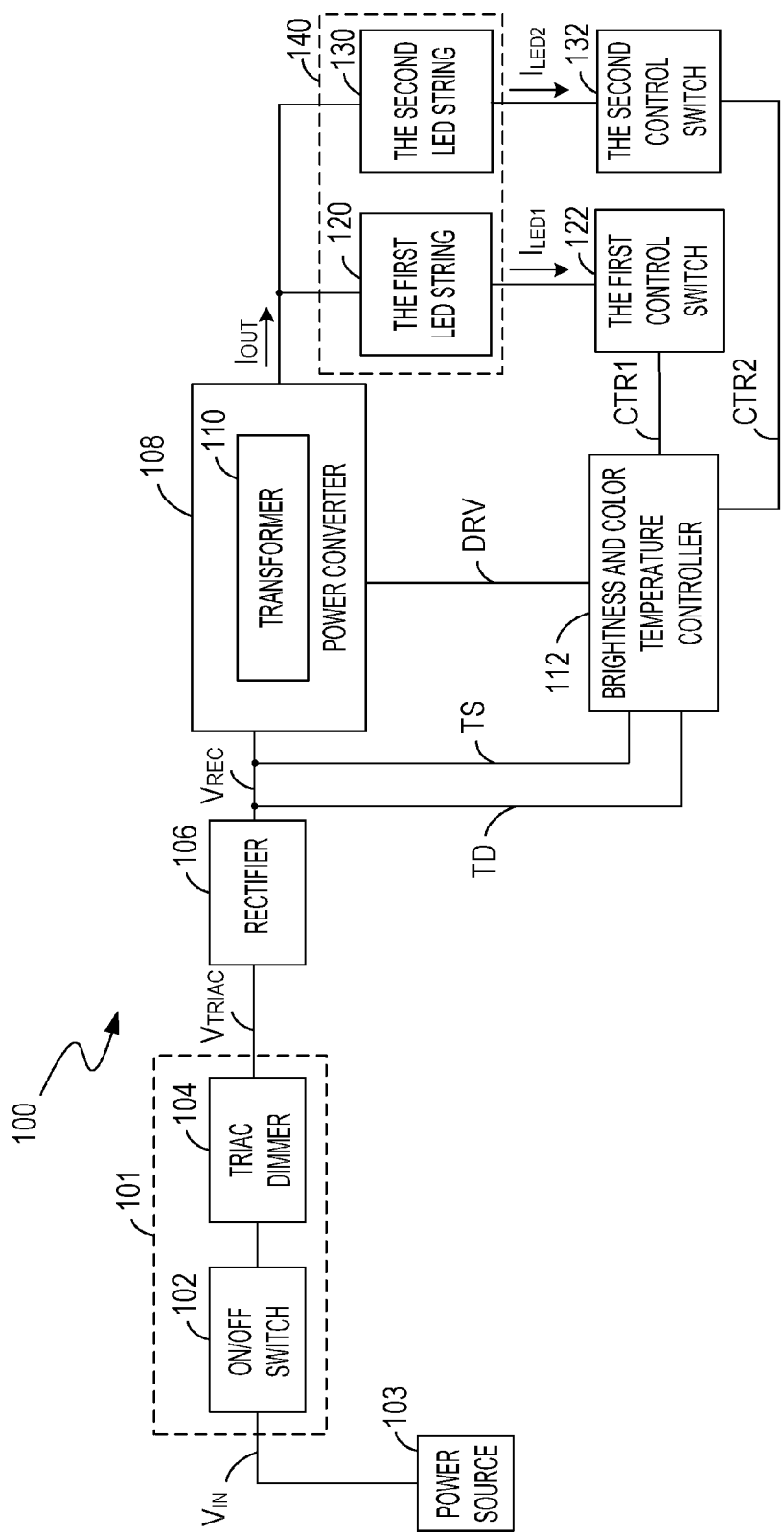
FIG. 1A shows a block diagram of a light-source driving circuit, in an embodiment according to the present invention.
Figure 2:
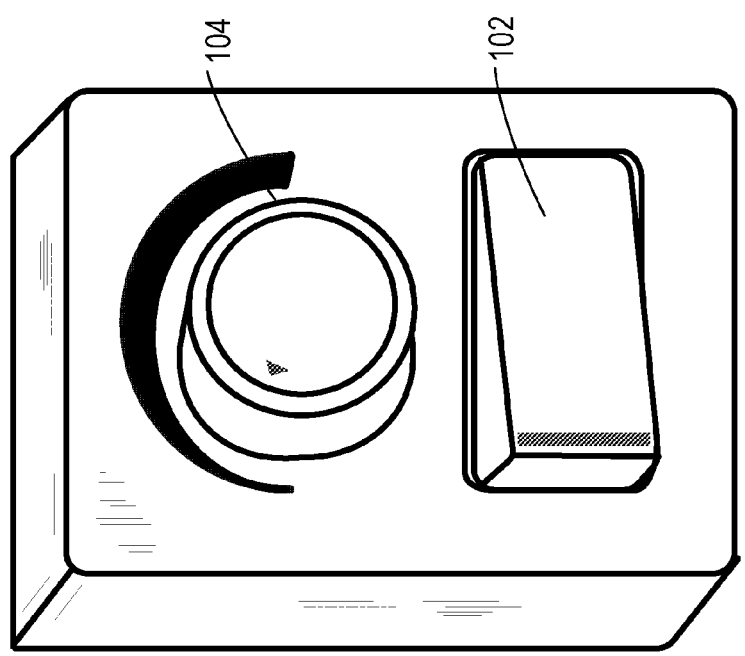
FIG. 2 shows an example of a power switch in an embodiment according to the present invention.
Figure 3:
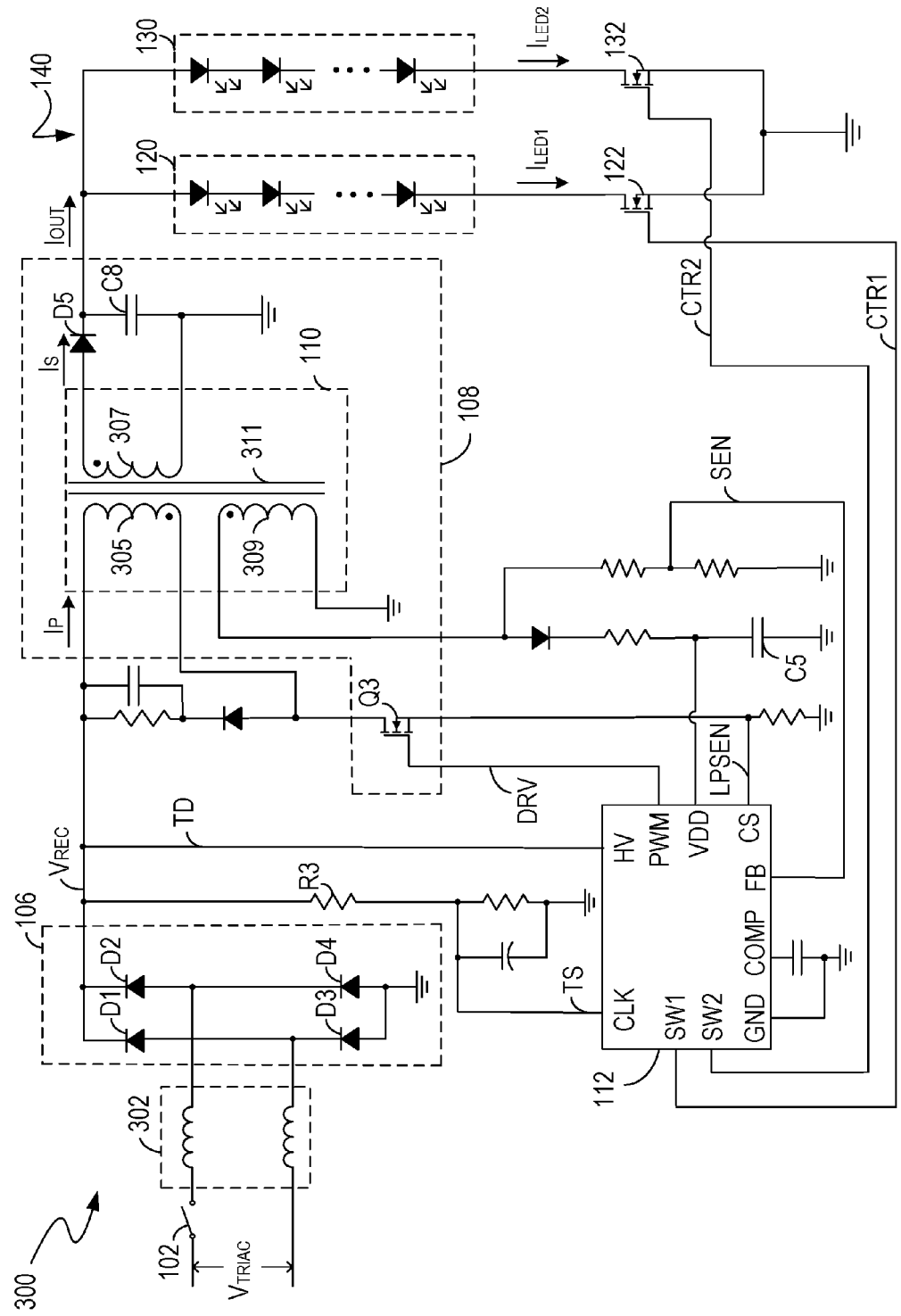
FIG. 3 shows an example of a schematic diagram of a light-source driving circuit, in an embodiment according to the present invention.

FIG. 1A shows a block diagram of a light-source driving circuit 100 for driving a light source 140, in an embodiment according to the present invention. In one embodiment, the light source 140 includes a first light-emitting component (e.g., a first LED string 120) and a second light-emitting component (e.g., a second LED string 130). The second LED string 130 can have a different color temperature from the first LED string 120. For example, the first LED string 120 has a first color temperature level and the second LED string 130 has a second color temperature level. A power switch 101, e.g., including an ON/OFF switch 102 (e.g., a rocker switch) and a dimmer 104, can be coupled between a power source 103 and the light-source driving circuit 100 and is operable for selectively coupling the power source 103 to the light-source driving circuit 100. The dimmer 104 can be a TRIAC (Triode Alternating Current) dimmer. The ON/OFF switch 102 can be coupled between the power source 103 and the TRIAC dimmer 104 (e.g., as shown in FIG. 1A) or coupled to the power source 103 through the TRIAC dimmer 104 (e.g., as shown in FIG. 3). In one embodiment, the power switch 101 can be a switch device mounted on a wall, e.g., as shown in FIG. 2. In the example of FIG. 2, the TRIAC dimmer 104 is located, but is not limited to be, on the upper part of the switch device, and the ON/OFF switch 102 is located, but is not limited to be, on the lower part of the switch device. In operation, the power switch 101 can be turned on or turned off by switching the ON/OFF switch 102 to an ON position or an OFF position. The color temperature of the light source 140 can also be adjusted by controlling the ON/OFF switch 102, e.g., by turning off the ON/OFF switch 102. Additionally, a user can adjust the brightness of the light source 140 by controlling the TRIAC dimmer 104, e.g., by rotating a knob-like switch.

As shown in FIG. 1A, an AC input voltage $V_{IN}$ from the power source 103 is converted to an AC voltage $V_{TRIAC}$ by the ON/OFF switch 102 and the TRIAC dimmer 104. The light-source driving circuit 100 includes a rectifier 106 for converting the AC voltage $V_{TRIAC}$ to a rectified voltage $V_{REC}$, a power converter 108 coupled between the rectifier 106 and the light source 140 (e.g., including the first LED string 120 and the second LED string 130), a brightness and color temperature controller 112 (hereinafter, controller 112), a first switch 122, and a second switch 132. The power converter 108 is operable for receiving the rectified voltage $V_{REC}$ from the rectifier 106 and for providing a regulated output current $I_{OUT}$ to the light source 140 (e.g., including the first LED string 120 and the second LED string 130). In one embodiment, the power converter 108 includes a transformer 110 having a primary winding and a secondary winding. The controller 112 can be coupled between the primary winding of the transformer 110 and the light source 140 (e.g., including the first LED string 120 and the second LED string 130). The controller 112 is operable for receiving an operation indicating signal TS indicative of operation (e.g., a turn-off operation) of the ON/OFF switch 102 and for adjusting the color temperature of the light source 140 (e.g., including the first LED string 120 and the second LED string 130) based on the operation indicating signal TS. As shown in FIG. 1A, the controller 112 generates a first control signal CTR1 and a second control signal CTR2 to control the first LED string 120 and the second LED string 130 based on the operation indicating signal TS.

The first control signal CTR1 can selectively turn on a first control switch 122 coupled between the controller 112 and the first LED string 120 so that the color temperature of the light source 140 is adjusted to the first color temperature level. Similarly, the second control signal CTR2 can selectively turn on a second control switch 132 coupled between the controller 112 and the second LED string 130 so that the color temperature of the light source 140 is adjusted to the second color temperature level. More specifically, if the first control signal CTR1 turns on the first control switch 122 coupled between the controller 112 and the first LED string 120, then a current $I_{LED1}$ flows through the first LED string 120 and the color temperature of the light source 140 is adjusted to the first color temperature level. If the second control signal CTR2 turns on the second control switch 132 coupled between the controller 112 and the second LED string 130, then a current $I_{LED2}$ flows through the second LED string 130 and the color temperature of the light source 140 is adjusted to the second color temperature level.

Figure 1B:
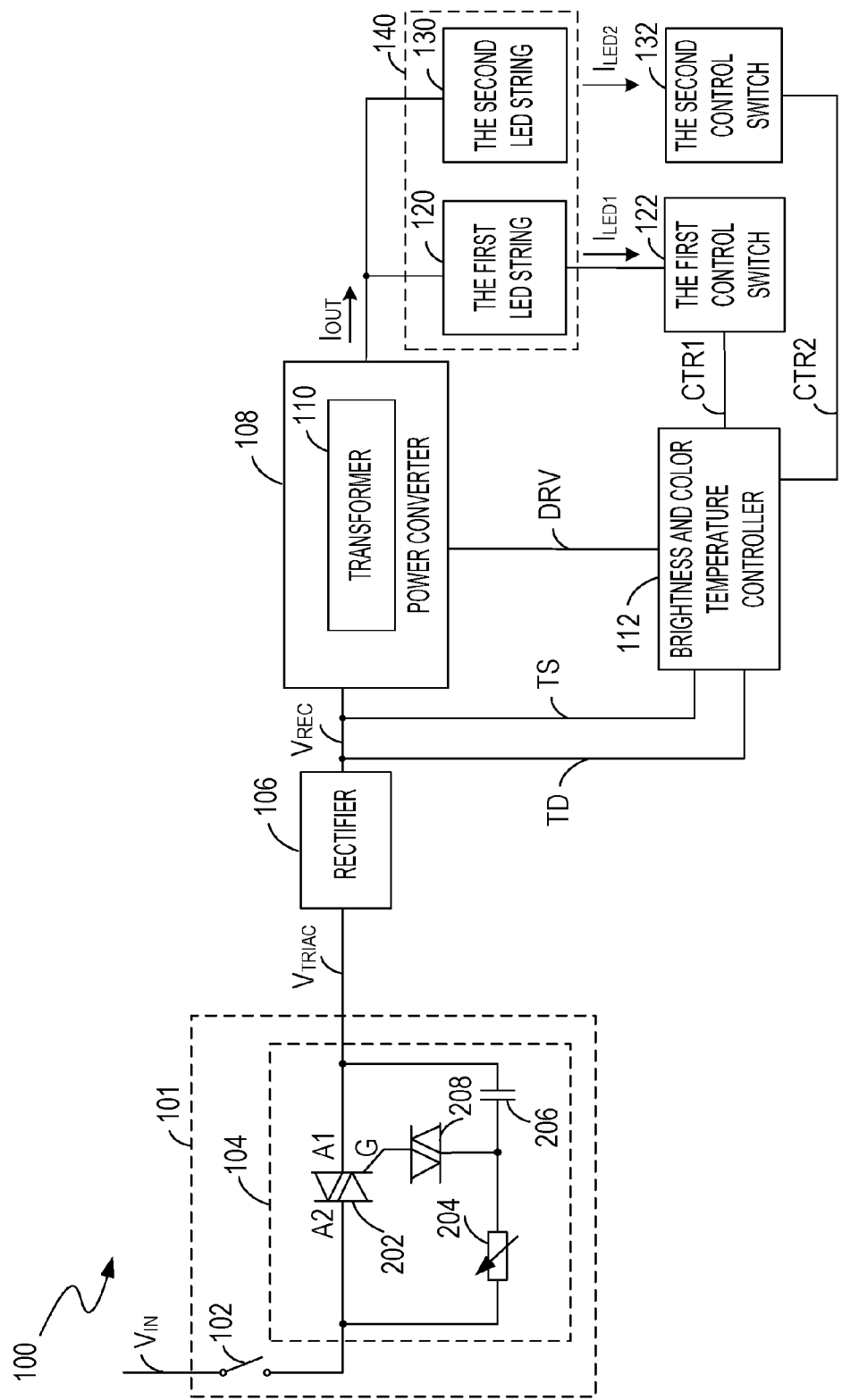
FIG. 1B shows a block diagram of a light-source driving circuit, in an embodiment according to the present invention.

Moreover, the controller 112 receives a conduction status signal TD indicating a conduction state of the TRIAC dimmer 104 (e.g., a conduction angle ranging from 0 to 180 degrees), and adjusts the brightness of the light source 140 (e.g., by adjusting the value of the current $I_{LED1}$ or $I_{LED2}$) based on the conduction status signal TD. The "conduction angle" will be described in combination with FIG. 4 below. An example of adjusting the brightness is described in combination with FIG. 1B and FIG. 1C. FIG. 1B shows a block diagram of a light-source driving circuit 100 including the ON/OFF switch 102 and the TRIAC dimmer 104, in an embodiment according to the present invention. As shown in FIG. 1B, the TRIAC dimmer 104 includes a TRIAC component 202 coupled between the ON/OFF switch 102 and the rectifier 106. The TRIAC component 202 includes a main terminal A1, a main terminal A2, and a gate terminal G. The TRIAC dimmer 104 also includes an adjustable resistor 204 and a capacitor 206 coupled in series, and a DIAC (Diode for Alternating Current) component 208. A terminal of the DIAC component 208 is coupled to the capacitor 206, and another terminal of the DIAC component 208 is coupled to the gate terminal G of the TRIAC component 202. The TRIAC component 202 is bidirectional and can conduct current in either direction when triggered. The TRIAC component 202 can be triggered by either a positive or negative current at the gate terminal G. When the TRIAC component 202 has been triggered, the TRIAC component 202 can keep conducting until a current between the main terminals A1 and A2 decreases to be less than a current threshold (e.g., referred to as a latching current $I_H$).

Figure 1C:
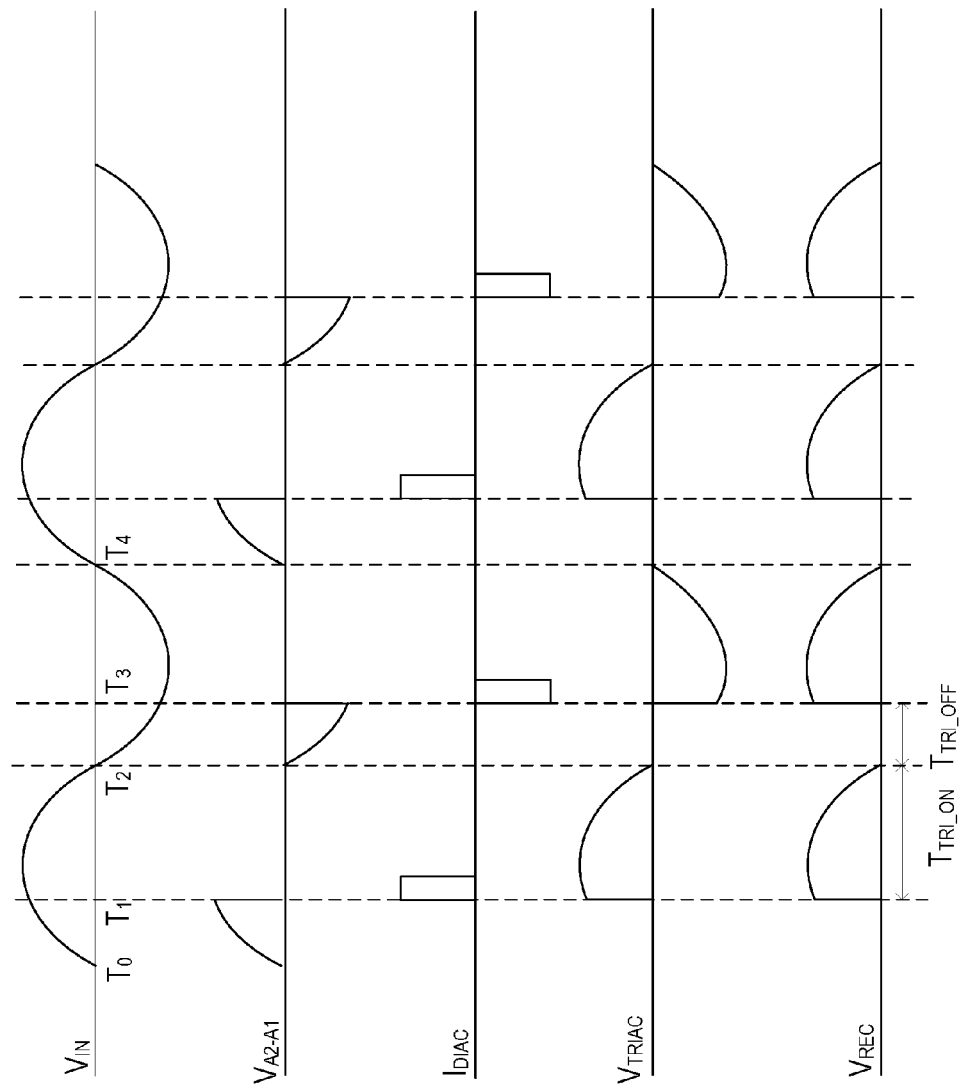
FIG. 1C shows examples of waveforms of signals associated with a TRIAC dimmer 104, in an embodiment according to the present invention.

FIG. 1C shows waveforms of signals associated with the TRIAC dimmer 104 in FIG. 1B, in an embodiment according to the present invention. FIG. 1C is described in combination with FIG. 1B. In the example of FIG. 1C, $V_{IN}$ represents the abovementioned AC input voltage from the power source 103, $V_{A2-A1}$ represents a voltage difference between the main terminals A1 and A2 of the TRIAC component 202, $I_{DIAC}$ represents a current flowing through the DIAC component 208, $V_{TRIAC}$ represents the AC voltage output from the power switch 101, and $V_{REC}$ represents the rectified voltage output from the rectifier 106.

In the example of FIG. 1C, the AC input voltage $V_{IN}$ is in sine wave. From time $T_0$ to time $T_1$, the TRIAC component 202 is turned off, and the voltage difference $V_{A2-A1}$ between the terminal A1 and the terminal A2 of the TRIAC component 202 increases as the AC input voltage $V_{IN}$ increases. From time $T_1$ to time $T_2$, the TRIAC component 202 is turned on. Thus, the wave form of the AC voltage $V_{TRIAC}$ is consistent with the AC input voltage $V_{IN}$.

At time $T_2$, e.g., at the end of a half-cycle of the AC input voltage $V_{IN}$, the TRIAC component 202 is turned off as the current flowing through the TRIAC component 202 has decreased to be less than the latching current $I_H$ of the TRIAC component 202. During the next half-cycle of the AC input voltage $V_{IN}$, the TRIAC component 202 is turned on again when the voltage cross on the capacitor 206 turns on the DIAC component 208, e.g., at time $T_3$. Similarly, the wave form of the AC voltage $V_{TRIAC}$ is consistent with the AC input voltage $V_{IN}$ from time $T_3$ to time $T_4$.

In one embodiment, a user can adjust the resistance of the adjustable resistor 204. For example, the resistance $R_{204}$ of the adjustable resistor 204 can be adjusted by rotating the knob of the TRIAC dimmer 104, and the resistance $R_{204}$ of the adjustable resistor 204 can determine the time when the TRIAC component 202 is turned on during each half-cycle of the AC input voltage $V_{IN}$. More specifically, in one embodiment, if the resistance $R_{204}$ of the adjustable resistor 204 increases, then an average level of the current that charges the capacitor 206 can decrease. Accordingly, it takes more time for the voltage on the capacitor 206 to increase to the threshold voltage of the DIAC component 208, and the turning on of the TRIAC component 202 can be postponed, e.g., later than time $T_1$. Similarly, if the resistance $R_{204}$ of the adjustable resistor 204 decreases, then the turning on of the TRIAC component 202 can be advanced, e.g., earlier than time $T_1$. Therefore, the time when the TRIAC component 202 is turned on in each half-cycle can be adjusted, e.g., postponed or advanced, by adjusting the resistance $R_{204}$ of the adjustable resistor 204.

In the examples of FIG. 1B and FIG. 1C, adjusting the resistance $R_{204}$ of the adjustable resistor 204 controls the time when the TRIAC component 202 is turned on. However, the invention is not so limited. In another embodiment, the TRIAC dimmer 104 can have another circuit structure, and adjusting resistance of a resistor, e.g., similar to the adjustable resistor 204, can control the time when the TRIAC component 202 is turned off.

Referring to the FIG. 1A and FIG. 1B, the controller 112 receives a conduction status signal TD indicating a conduction state of the TRIAC dimmer 104 (e.g., a conduction angle ranging from 0 to 180 degrees), and adjusts the brightness (e.g., the value of the current $I_{LED1}$ or $I_{LED2}$) of the light source 140 based on the conduction status signal TD. The controller 112 generates a driving signal DRV based on the conduction status signal TD. The driving signal DRV selectively turns on or turns off a control switch (e.g., Q3 in FIG. 3) in the power converter 108 to operate in a first condition (e.g., ON condition) or a second condition (e.g., OFF condition), so as to adjust the average current flowing through the LED light source 140 (e.g., the current $I_{LED1}$ and the current $I_{LED2}$). More specifically, in one embodiment, the controller 112 monitors the time when the TRIAC component 202 is turned on in each cycle based on the conduction status signal TD. If the conduction status signal TD indicates that the time when the TRIAC component 202 is turned on is postponed, then the controller 112 decreases the average current flowing through the LED light source 140 (e.g., including the first LED string 120 and the second LED string 130) by controlling the control switch Q3. Similarly, if the conduction status signal TD indicates that the time when the TRIAC component 202 is turned on is advanced, then the controller 112 increases the average current flowing through the LED light source 140 (e.g., including the first LED string 120 and the second LED string 130) by controlling the control switch Q3. In one embodiment, if the controller 112 generates a first control signal CTR1 to turn on the first control switch 122 based on the operation indicating signal TS, and adjusts the color temperature of the light source 140 to a first color temperature level, then the controller 112 adjusts the average current $I_{LED1}$ flowing through the first LED light source 120 according to the operation of the TRIAC dimmer 104. If the controller 112 generates a second control signal CTR2 to turn on the second control switch 132 based on the operation indicating signal TS, and adjusts the color temperature of the light source 140 to a second color temperature level, then the controller 112 adjusts the average current $I_{LED2}$ flowing through the second LED light source 130 according to the operation of the TRIAC dimmer 104.

Advantageously, the controller 112 can adjust the color temperature and brightness of the light source 140 (e.g., including the first LED string 120 and the second LED string 130) by operating the ON/OFF switch 102 and the TRIAC dimmer 104 without using an extra apparatus such as a specially designed switch with adjusting buttons, thus reducing the cost. The operation of the controller 112 is further described in combination with FIG. 3.

FIG. 3 shows an example of a schematic diagram of a light-source driving circuit 300, in an embodiment according to the present invention. The light-source driving circuit 300 can be an example of the abovementioned light-source driving circuit 100. For simplicity, the input voltage $V_{IN}$ and the TRIAC dimmer 104 are not shown in FIG. 3. The light-source driving circuit 300 is powered by a power source (e.g., 110/120 Volt AC, 60 Hz; not shown in FIG. 3) via the ON/OFF switch 102 and the TRIAC dimmer 104. The AC voltage $V_{TRIAC}$ is converted to the rectified voltage $V_{REC}$ via a filter 302 and the rectifier 106 (e.g., a bridge rectifier constituted by diodes D1-D4). The power converter 108 receives the rectified voltage $V_{REC}$ from the rectifier 106, and provides a regulated output current $I_{OUT}$ to the light source 140 (e.g., including the first LED string 120 and the second LED string 130).

In the example of FIG. 3, the power converter 108 includes a transformer 110, a control switch Q3, a diode D5, and a capacitor C8. The transformer 110 includes a primary winding 305 for receiving the rectified voltage $V_{REC}$ from rectifier 106, a secondary winding 307 for providing an output current $I_{OUT}$ to the first LED string 120 and the second LED string 130, a magnetic core 311, and an auxiliary winding 309 for providing power to the controller 112. For illustrative purposes, three windings are shown in the example of FIG. 3. However, in another embodiment, a different number of windings can be included in the transformer 110. In the embodiment shown in FIG. 3, the control switch Q3 coupled to the primary winding 305 is located outside the controller 112. Alternatively, the control switch Q3 can be integrated in the controller 112.

The controller 112 is electrically coupled to the primary winding 305 and the auxiliary winding 309 of the transformer 110. The controller 112 can be a flyback PWM controller, which is operable for generating a pulse-width modulation (PWM) signal DRV to selectively turn on the control switch Q3 coupled in series with the primary winding 305, and for adjusting the output current $I_{OUT}$ of the transformer 110 by adjusting a duty cycle of the PWM signal DRV. By way of example, and not limitation, terminals of the controller 112 include HV, CLK, PWM, VDD, GND, COMP, CS, FB, SW1 and SW2.

In one embodiment, the controller 112 receives a conduction status signal TD from the rectified voltage $V_{REC}$ at the terminal HV and adjusts the average current (e.g., the value of the current $I_{LED1}$ or the current $I_{LED2}$) flowing through the light source 140 based on the conduction status signal TD. Specifically, the conduction status signal TD can indicate a conduction state of the TRIAC component 202 in the TRIAC dimmer 104 (e.g., a conduction angle ranging from 0 to 180 degrees). The controller 112 can provide a reference signal REF (which will be described in combination with FIG. 4 and FIG. 5 below) corresponding to the conduction angle of the TRIAC dimmer 104, based on the conduction status signal TD. The controller 112 can also generate the driving signal DRV at the terminal PWM according to the reference signal REF, thereby adjusting the average current (e.g., the value of the current $I_{LED1}$ or the current $I_{LED2}$) flowing through the LED light source 140.

Advantageously, the brightness of the light source 140 (e.g., including the first LED string 120 and the second LED string 130) in the secondary-side circuit can be regulated to a target brightness level (for example, 25%, 50%, 75%, 90% and 100% of a maximum brightness) corresponding to a conduction angle of the TRIAC dimmer 104, by operating the TRIAC dimmer 104 in the primary-side circuit.

In one embodiment, the controller 112 receives an operation indicating signal TS indicative of a conductance status, e.g., an ON/OFF status, of the ON/OFF switch 102 at the terminal CLK. The controller 112 can generate a first control signal CTR1 at the terminal SW1 and a second control signal CTR2 at the terminal SW2 to control the first LED string 120 and the second LED string 130 based on the operation indicating signal TS. By way of example, if the operation indicating signal TS indicates that the ON/OFF switch 102 is turned on for the first time, then the first control signal CTR1 can turn on the first control switch 122, and the second control signal CTR2 can turn off the second control switch 132. Hence, a current $I_{LED1}$ flows through the first LED string 120 and no current flows through the second LED string 130. If the operation indicating signal TS indicates that the ON/OFF switch 102 is turned off and turned on again within a predetermined time period, then the first control signal CTR1 can turn off the first control switch 122, and the second control signal CTR2 can turn on the second control switch 132. Hence, no current flows through the first LED string 120, and a current $I_{LED2}$ flows through the second LED string 130. Since the second LED string 130 can have a different color temperature from the first LED string 120, the controller 112 can adjust the color temperature of the light source 140 based on the operation indicating signal TS.

The terminal FB receives a current monitoring signal SEN, indicating a level of the current $I_S$ flowing through the secondary winding 307, from a voltage divider coupled to the auxiliary winding 309 of the transform 110. The current monitoring signal SEN indicates when the current $I_S$ flowing through the secondary winding 307 decreases to zero. The terminal CS receives a sensing signal LPSEN indicating a current flowing through the primary winding 305. The controller 112 receives the current monitoring signal SEN and the sensing signal LPSEN, and generates a driving signal DRV at the terminal PWM to control the control switch Q3 (for example, turn on or off the switch). For example, when the current monitoring signal SEN indicates that the current $I_S$ flowing through the secondary winding 307 decreases to zero, the driving signal DRV switches the control switch Q3 from OFF status to ON status. More specifically, the voltage of the current monitoring signal SEN can be compared with that of a reference signal indicating a target current level $I_{TARGET}$ flowing through the light source, and the voltage of the sensing signal LPSEN can be compared with that of another reference signal indicating the target current level $I_{TARGET}$. If either or both of the comparison results indicate that an instant current level flowing through the light source 140 is greater than the target current level $I_{TARGET}$, then the controller 112 decreases the duty cycle of the driving signal DRV. In one embodiment, if the driving signal DRV is in a first state (e.g., logic high), then the control switch Q3 is turned on, a current $I_P$ flows through the primary winding 305, and the magnetic core 311 stores energy. If the driving signal DRV is in a second state (e.g., logic low), then the control switch Q3 is turned off, and the diode D5 coupled to the secondary winding 307 is forward-biased so that the energy stored in the magnetic core 311 is released to the capacitor C8 and the light source 140 through the secondary winding 307. Accordingly, the power of the light source 140 (e.g., the first LED string 120 and the second LED string 130) is adjusted based on the driving signal DRV.

The terminal VDD is coupled to the auxiliary winding 309. In one embodiment, an energy storage unit, e.g., a capacitor C5, coupled between the terminal VDD and ground can power the controller 112 when the ON/OFF switch 102 is turned off. The terminal COMP is coupled to the ground through a capacitor, and provides an error signal.

Advantageously, in response to a turn-off operation of the ON/OFF switch 102 in the primary-side circuit, the color temperature of the light source 140 (e.g., including the first LED string 120 and the second LED string 130) in the secondary-side circuit can be adjusted to a target level (e.g., a first color temperature or a second color temperature) by the controller 112 after the ON/OFF switch 102 is turned on again within a predetermined time period after the turn-off operation of the ON/OFF switch 102.

Figure 4:
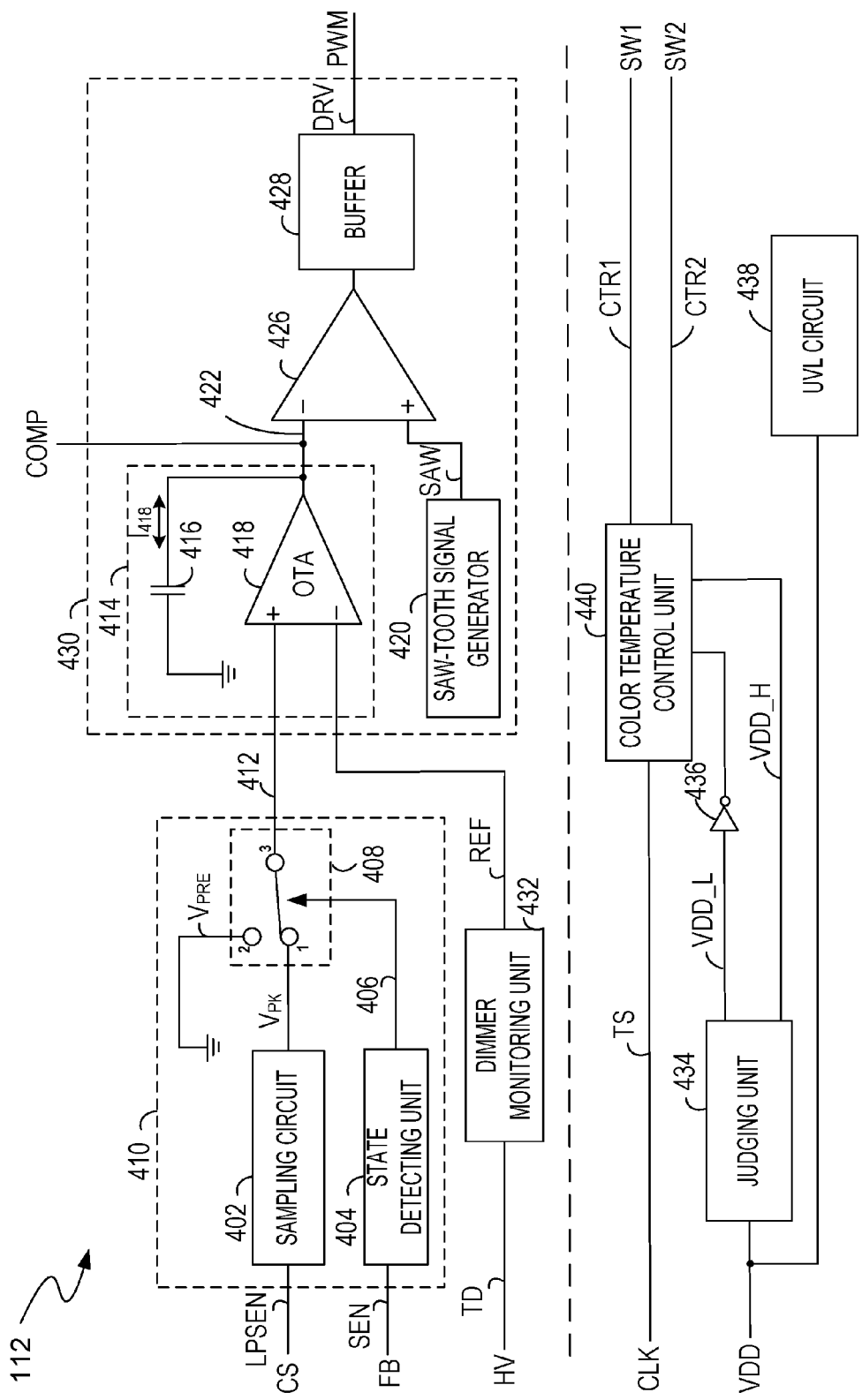
FIG. 4 shows an example of a structure of a brightness and color temperature controller, in an embodiment according to the present invention.

FIG. 4 shows an example of a structure of the controller 112 in FIG. 3, in an embodiment according to the present invention. FIG. 4 is described in combination with FIG. 3. In one embodiment, the controller 112 includes a brightness control module, e.g., shown in the upper part of FIG. 4, and a color temperature control module, e.g., shown in the lower part of FIG. 4.

Examples of operations of the brightness control module are described as follows. The brightness control module includes a signal generator 410, a dimmer monitoring unit 432, and a driver 430. The signal generator 410 generates a monitoring signal, e.g., a square signal 412. An average voltage of the monitoring signal is proportional to the average output current $I_{OUT}$ (e.g., the current $I_{LED1}$ or the current $I_{LED2}$) flowing through the LED light source 140 (e.g., including the first LED string 120 and the second LED string 130). The dimmer monitoring unit 432 generates a reference signal REF based on the conduction status signal TD. The reference signal REF indicates a target current level $I_{TARGET}$ of the average current flowing through the light source 140 (e.g., including the first LED string 120 and the second LED string 130). Accordingly, the driver 430 generates a driving signal based on the square signal 412 and the reference signal REF. The signal generator 410, the driver 430, and the transformer 110 can constitute a negative feedback loop circuit. The negative feedback loop circuit can maintain the average voltage of the square signal 412 at the voltage level of the reference signal REF, so as to maintain the average current $I_{OUT}$ flowing through the LED light source 140 (e.g., the first LED string 120 and the second LED string 130) at the target current level $I_{TARGET}$. In one embodiment, a user can adjust the conduction angle of the TRIAC dimmer 104 by operating the TRIAC dimmer 104, e.g., rotating a knob, thereby changing the reference signal REF. Thus, the brightness of the LED light source 140 can be regulated by operating the TRIAC dimmer 104.

In one embodiment, the signal generator 410 includes a sampling circuit 402, a state detecting unit 404, and a multiplexer 408. The sampling circuit 402 can receive/sample the monitoring signal LPSEN, indicative of the current flowing through the primary winding 305, through the terminal CS, and generate a peak signal $V_{PK}$ proportional to a peak level of the current flowing through the primary winding 305 based on the monitoring signal LPSEN. In one embodiment, the multiplexer 408 includes a switch including a first terminal, a second terminal, and a third terminal. The first terminal of the multiplexer 408 is coupled to an output terminal of the sampling circuit 402 for receiving the peak signal $V_{PK}$. The second terminal of the multiplexer 408 is coupled to, e.g., ground GND, for receiving a predetermined voltage signal $V_{PRE}$, e.g., zero volts. The third terminal of the multiplexer 408 is coupled to an input terminal of the deriver 430 for providing the square signal 412. In another embodiment, the second terminal of the multiplexer 408 can be coupled to a signal generator and receive a predetermined constant reference voltage.

In one embodiment, the state detecting unit 404 is coupled to a terminal FB for receiving a current monitoring signal SEN. The state detecting unit 404 can determine whether the transformer 110 is operating in a predetermined condition based on the current monitoring signal SEN, and generate a switch control signal 406 to control the multiplexer 408. More specifically, in one embodiment, when the current monitoring signal SEN is at a first voltage level which indicates that the transformer 110 is operating in the predetermined condition, the switch control signal 406 is in a first state (e.g., logic high). Therefore, the first terminal and the third terminal of the multiplexer 408 are connected. Thus, the square signal 412 is equal to the peak signal $V_{PK}$. When the current monitoring signal SEN is at a second voltage level which indicates that the transformer 110 is not operating in the predetermined condition, the switch control signal 406 is in a second state (e.g., logic low). Therefore, the second terminal and the third terminal of the multiplexer 408 are connected. Thus, the square signal 412 is equal to the predetermined voltage signal $V_{PRE}$.

Advantageously, the dimmer monitoring unit 432 can adjust the reference signal REF according to the TRIAC dimmer 104. More specifically, in one embodiment, if the conduction status signal TD indicates that the turning on of the TRIAC component 202 is advanced in each cycle, e.g., the conduction angle is increased, then the dimmer monitoring unit 432 increases the reference signal REF. Thus, the average current flowing through the LED light source 140 (e.g., including the first LED string 120 and the second LED string 130) is increased. Similarly, if the conduction status signal TD indicates that the turning on of the TRIAC component 202 is postponed in each cycle, e.g., the conduction angle is decreased, then the dimmer monitoring unit 432 decreases the reference signal REF. Thus, the average current flowing through the LED light source 140 (e.g., including the first LED string 120 and the second LED string 130) is decreased. The brightness control module can have another circuit structure, and is not limited to the example in FIG. 4.

Figure 5:
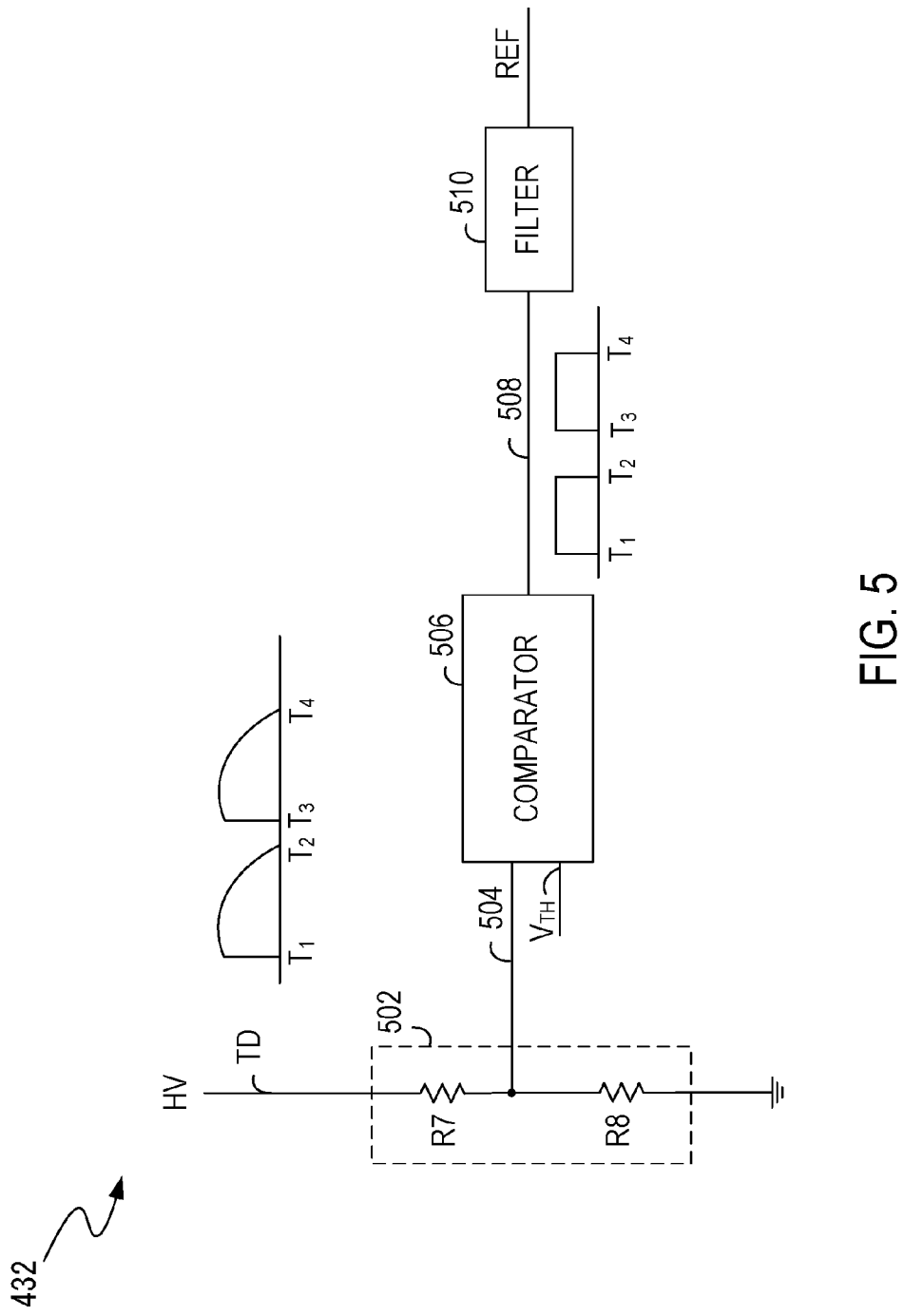
FIG. 5 shows an example of a schematic diagram of a dimmer monitoring unit, in an embodiment according to the present invention.

FIG. 5 shows an example of a schematic diagram of a dimmer monitoring unit 432 in FIG. 4, in an embodiment according to the present invention. FIG. 5 is described in combination with FIG. 4. As shown in FIG. 5, the dimmer monitoring unit 432 includes a voltage divider 502, a comparator 506, and a filter 510. In one embodiment, the voltage divider 502 includes a resistor R7 and a resistor R8 coupled in series. The voltage divider 502 receives the conduction status signal TD, and provides a voltage dividing signal 504 indicative of the rectified voltage $V_{REC}$. The comparator 506 compares the voltage dividing signal 504 with a threshold voltage $V_{TH}$ to obtain a comparison result and generates a square signal 508 based on the comparison result. The filter 510 can filter the square signal 508 to generate the reference signal REF.

Specifically, in one embodiment, during the ON time $T_{TRI\_ON}$ from time $T_1$ to time $T_2$, the voltage dividing signal 504 is greater than the threshold voltage $V_{TH}$, e.g., zero volts, and therefore the square signal 508 is switched to logic high. During the OFF time $T_{TRI\_OFF}$ from time $T_2$ to time $T_3$, the voltage dividing signal 504 is not greater than the threshold voltage $V_{TH}$, and therefore the square signal 508 is switched to logic low. When the ON time for the TRIAC component 202 is changed, the average voltage of the square signal 508 is changed accordingly. The filter 510 filtrates the square signal 508 to provide the reference signal REF which is proportional to the average voltage of the square signal 508. Thus, the average current flowing through the LED light source 140 (e.g., including the first LED string 120 and the second LED string 130) can be adjusted by regulating the reference signal REF, so as to control the brightness of the LED light source 140 (e.g., including the first LED string 120 and the second LED string 130) based on the TRIAC dimmer 104. The dimmer monitoring unit 432 can have another circuit structure and is not limited to the example in FIG. 5.

Referring to FIG. 4, the driver 430 can include an operational amplifier 414, a saw-tooth signal generator 420, a comparator 426, and a buffer 428. The operational amplifier 414 includes an OTA (Operational Transconductance Amplifier) 418 and a capacitor 416. The non-invert terminal of the OTA 418 receives the square signal 412, and the invert terminal receives the reference signal REF. The reference signal REF indicates the target current level $I_{TARGET}$ of the output current $I_{LED1}$ or $I_{LED2}$. The OTA 418 generates a current $I_{418}$ at its output terminal to charge or discharge the capacitor 416 based on a difference between the square signal 412 and the reference signal REF, to generate an error signal 422. As the capacitor 416 filters the ripples on the error signal 422, the error signal 422 is determined by the difference between the average voltage of the square signal 412 and the reference signal REF. In another embodiment, the capacitor 416 is placed outside of the controller 112 and is coupled to the OTA 418 through a terminal of the controller 112.

The saw-tooth signal generator 420 generates a saw-tooth signal SAW. The comparator 426 compares the error signal 422 with the saw-tooth signal SAW, and generates a comparison result. The buffer 428 receives the comparison result, and generates a driving signal DRV, for example, a pulse-width modulation signal. As shown in FIG. 4, if the average voltage $V_{SQ\_AVG}$ of the square signal 412 increases to greater than the reference signal REF, then the error signal 422 increases and consequently it takes more time for the saw-tooth signal SAW to increase to the error signal 422. Therefore, the driver 430 decreases the duty cycle of the driving signal DRV to decrease the average current of the output current $I_{LED1}$ or $I_{LED2}$, which causes the average voltage $V_{SQ\_AVG}$ of the square signal 412 to decrease. The driver 430 can continue to decrease the duty cycle of the driving signal DRV until the average voltage $V_{SQ\_AVG}$ of the square signal 412 decreases to the reference signal REF. Similarly, when the average voltage $V_{SQ\_AVG}$ of the square signal 412 decreases to less than the reference signal REF, then the driver 430 increases the duty cycle of the driving signal DRV to increase the average current of the output current $I_{LED1}$ or $I_{LED2}$ and increase the average voltage $V_{SQ\_AVG}$ of the square signal 412. The driver 430 can continue to increase the duty cycle of the driving signal DRV until the average voltage $V_{SQ\_AVG}$ of the square signal 412 increases to the reference signal REF. Thus, the average current of the output current $I_{LED1}$ or $I_{LED2}$ can be adjusted to the target current level $I_{TARGET}$ so that the brightness of the light source 140 (e.g., including the first LED string 120 and the second LED string 130) is controlled.

Figure 6:
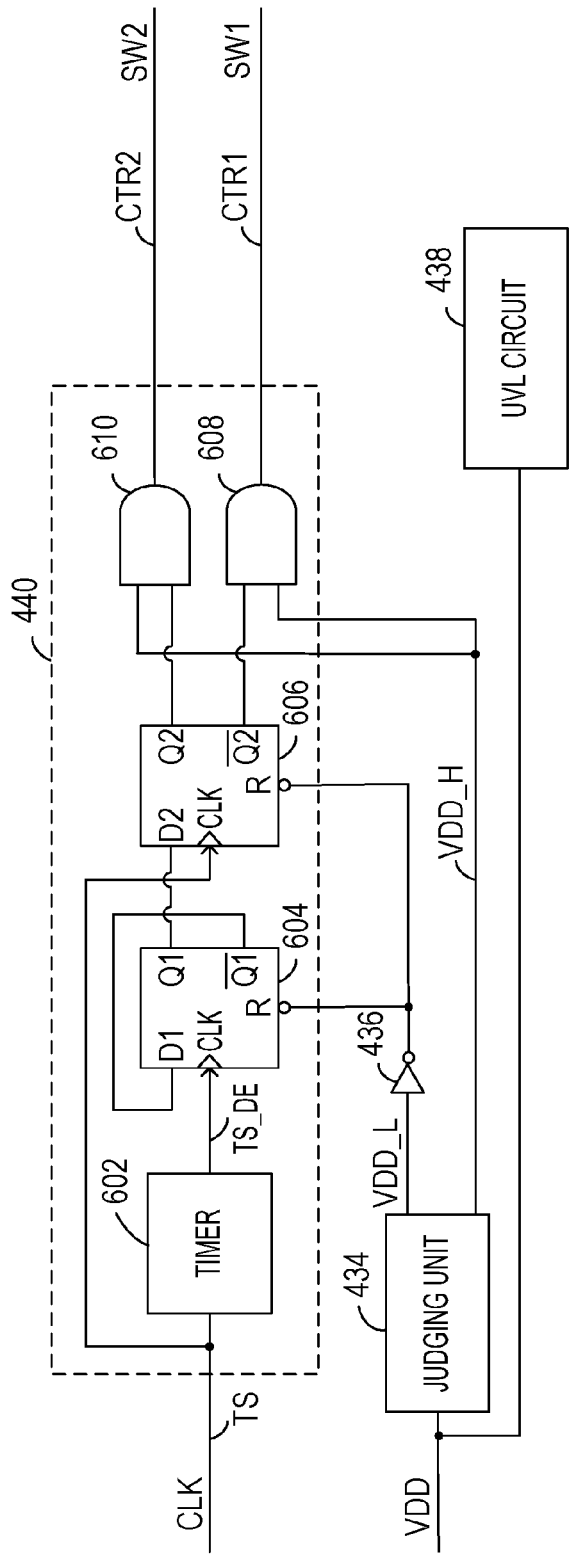
FIG. 6 shows an example of a schematic diagram of a color temperature control module, in an embodiment according to the present invention.

Examples of operations of the color temperature control module are described as follows. FIG. 6 shows an example of a schematic diagram of a color temperature control module in FIG. 4, in an embodiment according to the present invention. As shown in FIG. 6, the color temperature control module includes a judging unit 434, a NOT gate 436, a start up and under voltage lockout (UVL) circuit 438, and a color temperature control unit 440.

The UVL circuit 438 can be coupled to the terminal VDD for selectively turning on one or more components in the controller 112 based on different power conditions.

In one embodiment, if the voltage at the terminal VDD is greater than a first predetermined voltage, the UVL circuit 438 actives all components in the controller 112. When the ON/OFF switch 102 is turned off, the UVL circuit 438 turns off a part of components in the controller 112 to save power if the voltage at the terminal VDD is lower than a second predetermined voltage. The UVL circuit 438 turns off all components in the controller 112 if the voltage at the terminal VDD is lower than a third predetermined voltage. In one embodiment, the first predetermined voltage is greater than the second predetermined voltage, and the second predetermined voltage is greater than the third predetermined voltage.

The judging unit 434 can detect a power status of the controller 112 and generate a first judging signal VDD_L and a second judging signal VDD_H based on the power status of the controller 112. The controller 112 can adjust the color temperature of the light source 140 based on the first judging signal VDD_L, the second judging signal VDD_H, and the operation indicating signal TS. For example, if the voltage at the terminal VDD of the controller 112 is less than a reset threshold (e.g., 4V), the first judging signal VDD_L has a first state, e.g., logic high. If the voltage at the terminal VDD of the controller 112 is greater than the reset threshold (e.g., 4V), the first judging signal VDD_L has a second state, e.g., logic low. If the voltage at the terminal VDD of the controller 112 is less than an enable threshold (e.g., 10V), the second judging signal VDD_H has a first state, e.g., logic low. If the voltage at the terminal VDD is greater than the enable threshold (e.g., 10V), the second judging signal VDD_H has a second state, e.g., logic high.

The color temperature control unit 440 is operable for generating the first control signal CTR1 and the second control signal CTR2 to control the first LED string 120 and the second LED string 130 based on the operation indicating signal TS, the first judging signal VDD_L, and the second judging signal VDD_H. In one embodiment, the color temperature control unit 440 includes a timer 602, a first D flip-flop 604, a second D flip-flop 606, a first AND gate 608, and a second AND gate 610. The timer 602 receives the operation indicating signal TS and begins timing if the operation indicating signal TS has a falling edge. The timer 602 further generates a pulse signal TS_DE after a predefined time interval Δt following each falling edge of the operation indicating signal TS. The pulse signal TS_DE is coupled to the CLK input of the first D flip-flop 604, and the operation indicating signal TS is coupled to the CLK input of the second D flip-flop 606. The D1 input of the first D flip-flop 604 is coupled to its $\overline{Q1}$ output, and the Q1 output of the first D flip-flop 604 is coupled to the D2 input of the second D flip-flop 606.

The R inputs of the first D flip-flop 604 and the second D flip-flop 606 are both coupled to an output terminal of the NOT gate 436, and the input terminal of the NOT gate 436 is coupled to the judging unit 434. If the voltage at the terminal VDD is less than a reset threshold (e.g., 4V) (e.g., the first judging signal VDD_L is logic high), then the first D flip-flop 604 and the second D flip-flop 606 are reset via the NOT gate 436. Then, the Q1 output of the first D flip-flop 604 and the Q2 output of the second D flip-flop 606 are both reset to logic low, and the $\overline{Q1}$ output of the first D flip-flop 604 and the $\overline{Q2}$ output of the second D flip-flop 606 are both reset to logic high.

The second judging signal VDD_H and the $\overline{Q2}$ output of the second D flip-flop 606 are coupled to the first AND gate 608. The first AND gate 608 accordingly generates the first control signal CTR1 to control the first control switch 122 and the current $I_{LED1}$ flowing through the first LED string 120. The second judging signal VDD_H and the Q2 output of the second D flip-flop 606 are coupled to the second AND gate 610. The second AND gate 610 accordingly generates the second control signal CTR2 to control the second control switch 132 and the current $I_{LED2}$ flowing through the second LED string 130. In this way, the color temperature of the light source 140 can be adjusted by the controller 112 in response to the turn-off operation of the ON/OFF switch 102.

Figure 7:
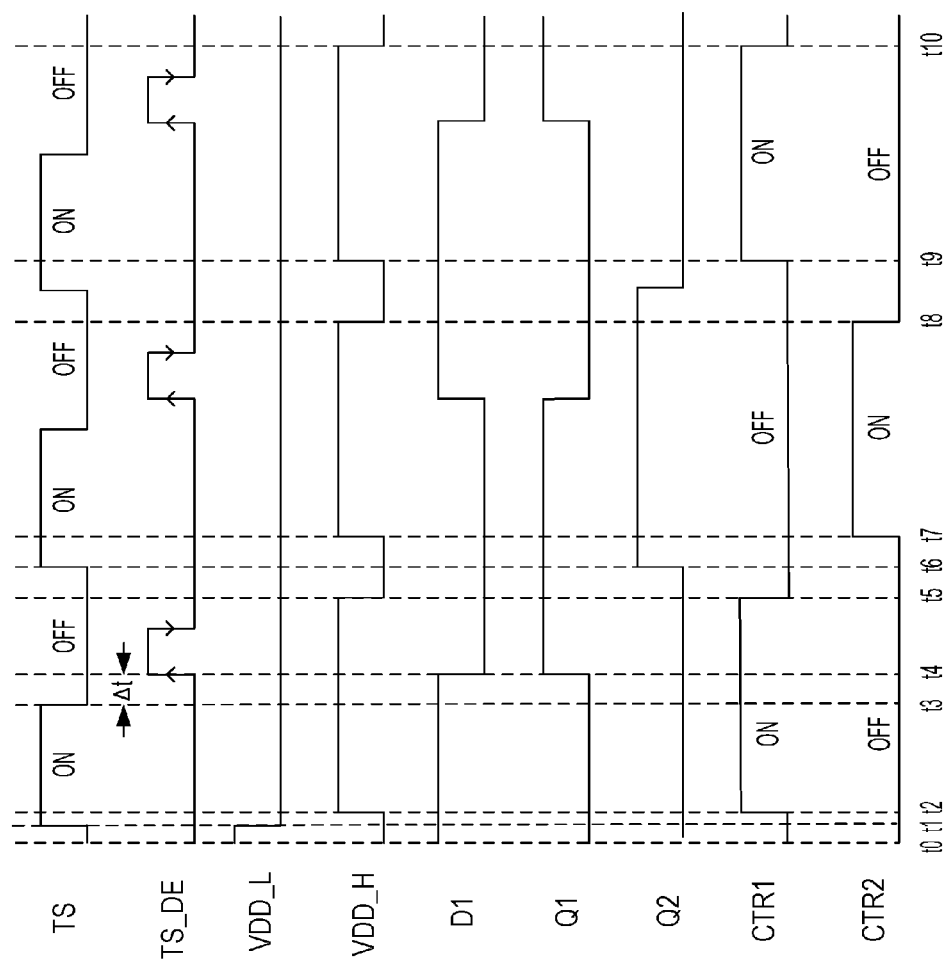
FIG. 7 illustrates examples of waveforms for signals in a light-source driving circuit that includes a color temperature controller, in an embodiment according to the present invention.

FIG. 7 illustrates examples of waveforms for signals in a light-source driving circuit that includes the color temperature controller in FIG. 6, in an embodiment according to the present invention. In FIG. 7, examples of signal waveforms for the operation indicating signal TS, the pulse signal TS_DE, the first judging signal VDD_L, the second judging signal VDD_H, the voltage at the D1 input, the voltage at the Q1 output, the voltage at the Q2 output, the first control signal CTR1, and the second control signal CTR2 are disclosed according to an embodiment of the present invention. FIG. 7 is described in combination with FIG. 3 and FIG. 6.

At time t0, the ON/OFF switch 102 is turned on. At time t1, the operation indicating signal TS changes from its first state (e.g., logic low) to its second state (e.g., logic high). The voltage at the terminal VDD is increased to the reset threshold (e.g., 4V) and the first judging signal VDD_L changes from its first state (e.g., logic high) to its second state (e.g., logic low). At time t2, the voltage at the terminal VDD is increased to the enable threshold (e.g., 10V) and the second judging signal VDD_H changes from its first state (e.g., logic low) to its second state (e.g., logic high). From t0 to t2, the Q1 output of the first D flip-flop 604 and the Q2 output of the second D flip-flop 606 are both logic low. Due to the second judging signal VDD_H (e.g., logic low)

received by the first AND gate 608 and the second AND gate 610, the first control signal CTR1 and the second control signal CTR2 are both logic low. After time t2, since the second judging signal VDD_H changes to logic high, the first control signal CTR1 also changes to logic high. Then, the first control switch 122 is turned on and the current $I_{LED1}$ starts to flow through the first LED string 120. At time t3, the ON/OFF switch 102 is turned off, and the voltage at the terminal VDD of the controller 112 starts to decrease. As mentioned above, once the operation indicating signal TS has a falling edge, a pulse signal TS_DE can be generated after a predefined time interval Δt. At time t4, in response to the rising edge of the pulse signal TS_DE, the D1 input of the first D flip-flop 604 changes from logic high to logic low, and the Q1 output of the first D flip-flop 604 changes from logic low to logic high. At time t5, the voltage at the terminal VDD is decreased to the enable threshold (e.g., 10V) and the second judging signal VDD_H changes from the second state (e.g., logic high) to the first state (e.g., logic low). Then, due to the second judging signal VDD_H (e.g., logic low) received by the first AND gate 608 and the second AND gate 610, the first control signal CTR1 and the second control signal CTR2 are both logic low.

At time t6, the ON/OFF switch 102 is turned on again and therefore a rising edge appears in the operation indicating signal TS at time t6. The time period between t3 and t6 is less than a predetermined (specified) time period (e.g., t6 minus t3<three (3) seconds), so that the voltage at the terminal VDD is kept above the reset threshold (e.g., 4V) and the first judging signal VDD_L is kept at logic low. In response to the rising edge of the operation indicating signal TS, the Q2 output of the second D flip-flop 606 changes from logic low to logic high and its $\overline{Q2}$ output changes from logic high to logic low. Similar to the time period between t1 and t2, the first control signal CTR1 and the second control signal CTR2 are both logic low from t6 to t7. After time t7, the voltage at the terminal VDD increases above the enable threshold (e.g., the second judging signal VDD_H changes to logic high), and the second control signal CTR2 also changes to logic high. The second control switch 132 is turned on and the current $I_{LED2}$ starts to flow through the second LED string 2130. Then, the ON/OFF switch 102 is turned off again, and the voltage at the terminal VDD is decreased to the enable threshold (e.g., 10V) at time t8. The waveforms between t8 and t10 are similar to those between t0 and t5. At time t9, the first control switch 122 is turned on and the current $I_{LED1}$ starts to flow through the first LED string 120.

Therefore, the controller 112 alternately turns on the first control switch 122 and the second control switch 132 in response to the turn-off operation of the ON/OFF switch 102. Since the second LED string 130 can have a different color temperature versus the first LED string 120, the color temperature of the light source 140 can be adjusted by the controller 112 in response to the turn-off operation of the ON/OFF switch 102.

In one embodiment, each of the signals TS, VDD_L and VDD_H has a first state (e.g., logic high or logic low) and a second state (e.g., logic low or logic high). In the example of FIG. 7, the first state of the signal TS is logic high, and the second state of the signal TS is logic low; the first state of the signal VDD_L is logic high, and the second state of the signal VDD_L is logic low; and the first state of the signal VDD_H is logic low, and the second state of the signal VDD_H is logic high. However, these are examples for illustrative purposes only and are not intended to limit the invention.

Figure 8:
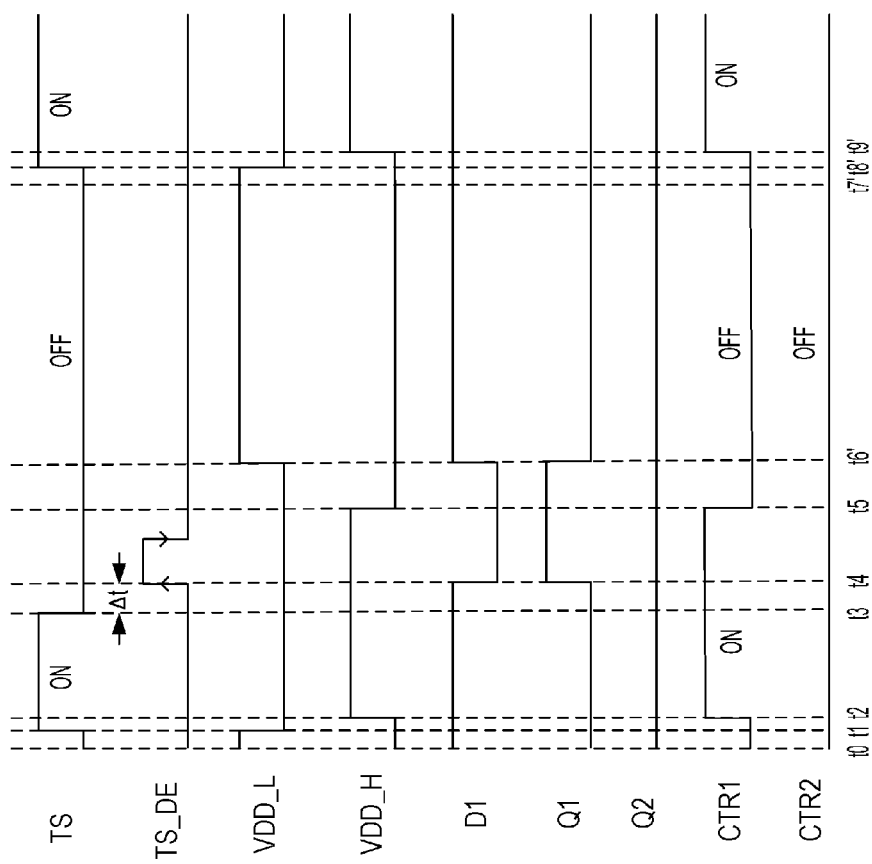
FIG. 8 illustrates examples of waveforms for signals in a light-source driving circuit that includes a color temperature controller, in another embodiment according to the present invention.

FIG. 8 illustrates examples of waveforms for signals in a light-source driving circuit that includes a color temperature controller in FIG. 6, in another embodiment according to the present invention. FIG. 8 illustrates examples of signal waveforms of the operation indicating signal TS, the pulse signal TS_DE, the first judging signal VDD_L, the second judging signal VDD_H, the voltage at the D1 input, the voltage at the Q1 output, the voltage at the Q2 output, the first control signal CTR1, and the second control signal CTR2, in accordance with one embodiment of the present invention. FIG. 8 is described in combination with FIG. 3, FIG. 6, and FIG. 7.

The waveforms between t0 and t6' are similar to those waveforms between t0 and t6 illustrated in FIG. 7. At time t7', the ON/OFF switch 102 is turned on again. The time period between t3 and t7' is greater than the predetermined time period (e.g., t7' minus t3>3 seconds). Therefore, at time t6', the voltage at the terminal VDD is decreased to the reset threshold (e.g., 4V) and the first judging signal VDD_L changes from logic low to logic high. The Q1 output and the Q2 output are both reset to logic low. Due to the second judging signal VDD_H (e.g., logic low) received by the first AND gate 608 and the second AND gate 610, the first control signal CTR1 and the second control signal CTR2 are both logic low.

At time t8', the operation indicating signal TS changes from its first state (e.g., logic low) to its second state (e.g., logic high). The voltage at the terminal VDD is increased to the reset threshold (e.g., 4V) and the first judging signal VDD_L changes from its first state (e.g., logic high) to its second state (e.g., logic low). At time t9', the voltage at the terminal VDD is increased to the enable threshold (e.g., 10V) and the second judging signal VDD_H changes from its first state (e.g., logic low) to its second state (e.g., logic high). The waveforms between t7' and t9' are similar to those between t0 and t2. After time t9', the voltage at the terminal VDD increases above the enable threshold (e.g., the second judging signal VDD_H changes to logic high), and the first control signal CTR1 also changes to logic high. Then, the first control switch 122 is turned on and the current $I_{LED1}$ starts to flow through the first LED string 120.

As shown in FIG. 7, if the operation indicating signal TS indicates that a time period between a turn-off operation and the turn-on operation that follows that turn-off operation (the next turn-on operation) of the ON/OFF switch 102 is less than a predetermined time period (e.g., 3 seconds), then the controller 112 changes the color temperature of the light source 140 (e.g., including the first LED string 120 and the second LED string 130) from a first color temperature level to a second color temperature level in response to the next turn-on operation of the ON/OFF switch 102. More specifically, in the example of FIG. 7, during a first time period (e.g., from t2 to t5), the first control signal CTR1 is logic high, the first LED string 120 is turned on and the second LED string 130 is turned off, so that the color temperature of the light source 140 is adjusted to the first color temperature level. Then, during a second time period, different from the first time period, e.g., from t7 to t8, the second control signal CTR2 is logic high, the first LED string 120 is turned off, and the second LED string 130 is turned on, so that the color temperature of the light source 140 is adjusted to the second color temperature level. Therefore, the controller 112 can switch the color temperature of the light source 140 between the color temperature levels of the first LED string 120 and the second LED string 130 by alternately turning on the first control switch 122 and the second control switch 132. However, as shown in FIG. 8, if the operation indicating signal TS indicates that a time period between a turn-off operation and a following (the next) turn-on operation of the ON/OFF switch 102 is greater than the predetermined time period (e.g., 3 seconds), then the controller 112 resets the color temperature of the light source 140 to a default color temperature in response to the next turn-on operation of the ON/OFF switch 102. In the example of FIG. 8, the default color temperature can be preset to the color temperature of the first LED string 120, for example, by the factory setting. The default color temperature can also be preset to any other suitable value and is not limited to the configuration as shown in the example of FIG. 8.

Figure 9:
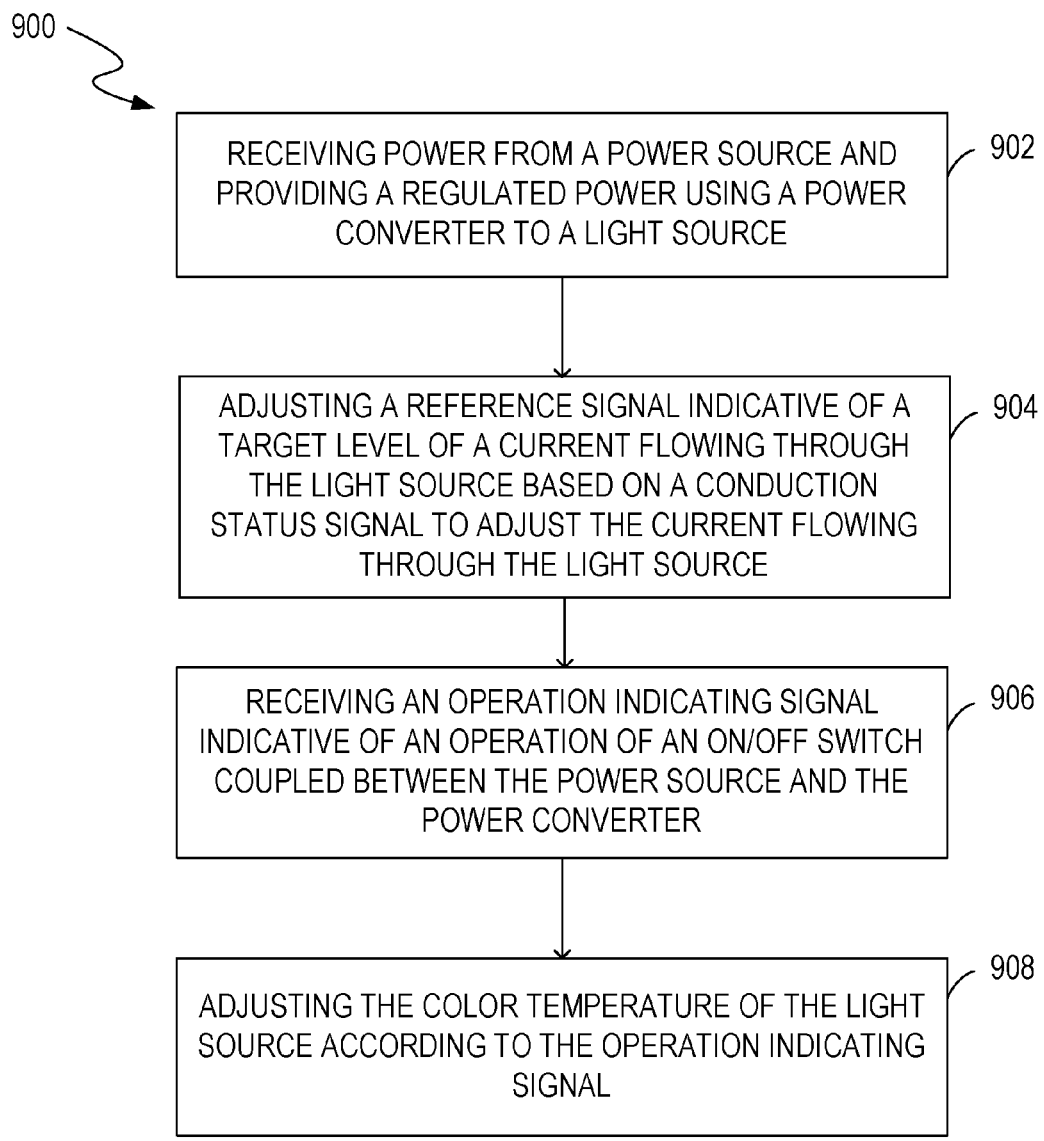
FIG. 9 shows a flowchart of a method for adjusting brightness and color temperature for a light source, in an embodiment according to the present invention.

FIG. 9 shows a flowchart 900 of operations performed by a brightness and color temperature controller, e.g., the controller 112, in an embodiment according to the present invention. FIG. 9 is described in combination with FIG. 1A-FIG. 8. Although specific steps are disclosed in FIG. 9, such steps are examples. That is, the present invention is well suited to performing various other steps or variations of the steps recited in FIG. 9.

In block 902, a driving circuit (e.g., the light-source driving circuit 100 or 300) receives power from a power source and provides a regulated power, using a power converter (e.g. the power converter 108), to a light source 140 (e.g., including the first LED string 120 and the second LED string 130). In block 904, the brightness and color temperature controller adjusts a reference signal indicative of a target current level of an output current flowing through the light source 140 based on a conduction status signal, adjusts the average current flowing through the light source 140, and regulates the brightness of the light source 140. In one embodiment, the controller 112 receives a conduction status signal TD indicating a conduction state of the TRIAC dimmer 104 coupled between the power source and the power convert, and adjusts the reference signal indicative of the target current level of the output current flowing through the light source 140 based on the conduction status signal TD. Specifically, the conduction status signal TD indicates a conduction state of a TRIAC component 202 in the TRIAC dimmer 104 (e.g., the conduction angle ranged from 0 to 180 degrees). The controller 112 provides the reference signal REF (as described in relation to FIG. 4 and FIG. 5) corresponding to a conduction angle of the TRIAC dimmer 104 based on the conduction status signal TD, and generates the driving signal DRV at the terminal PWM based on the reference signal REF so as to adjust the average current (e.g., the value of the current $I_{LED1}$ or current $I_{LED2}$) flowing through the LED light source 140.

In block 906, an operation indicating signal TS is received. The operation indicating signal TS indicates an operation of an ON/OFF switch, e.g., switch 102, coupled between the power source and the power converter.

In block 908, the color temperature of the light source 140 is adjusted based on the operation indicating signal TS. For example, during a first time period (e.g., in FIG. 7, from t2 to t5), the controller 112 can generate a first control signal CTR1 and a second control signal CTR2 to turn on a first LED string 120 having a first color temperature level and to turn off a second LED string 130 having a second color temperature level, so that the color temperature of the light source 140 is adjusted to the first color temperature level. During a second time period (e.g., in FIG. 7, from t7 to t8), different from the first time period, the controller 112 can generate the first control signal CTR1 and the second control signal CTR2 to turn off the first LED string 120 and to turn on the second LED string 130, so that the color temperature of the light source 140 is adjusted to the second color temperature level.

Advantageously, the controller 112 adjusts the color temperature of the light source 140 (e.g., including the first LED string 120 and the second LED string 130) according to the operation of the ON/OFF switch 102, as well as adjusting the brightness of the LED light source 140 (e.g., including the first LED string 120 and the second LED string 130) according to operation of the TRIAC dimmer 104 without using an extra apparatus such as a specially designed switch with adjusting buttons, and therefore can reduce the cost.

The discussion above is based on example embodiments that utilize LED strings. However, embodiments according to the present invention may be implemented using other types of lights; that is, embodiments according to the invention are not necessarily limited to LEDs. Such other types of lights may be referred to herein as light-emitting components.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A circuit for driving a light source having an adjustable color temperature, the driving circuit comprising:
   a power converter, coupled between a power source and the light source, operable for receiving power from the power source and for providing a regulated power to the light source; and
   a controller, coupled to the power converter, operable for receiving a conduction status signal indicating a conduction state of a dimmer coupled between the power source and the power converter, and operable for adjusting brightness of the light source based on the conduction status signal, wherein the controller is further operable for receiving an operation indicating signal indicative of operation of an ON/OFF switch coupled to the dimmer and adjusting color temperature of the light source based on the operation indicating signal,
   wherein the controller includes:
   a signal generator operable for generating a monitoring signal proportional to an output current flowing through the light source;
   a dimmer monitoring unit operable for receiving the conduction status signal and generating a reference signal indicative of a target level for the output current flowing through the light source based on the conduction status signal; and
   a driver, coupled to the signal generator and the dimmer monitoring unit, operable for generating a driving signal based on the monitoring signal and the reference signal to control the power converter to provide the regulated power to the light source.

2. The circuit as claimed in claim 1, wherein the signal generator, the driver, and a transformer in the power converter constitute a negative feedback loop circuit that maintains the output current flowing through the light source at the target level.

3. The circuit as claimed in claim 1, wherein the conduction status signal indicates a conduction angle of the dimmer, wherein when the conduction status signal indicates that the conduction angle is increased, then the dimmer monitoring unit increases the reference signal, and the driver adjusts the driving signal to increase the output current flowing through the light source, and wherein when the conduction status signal indicates that the conduction angle is decreased, then the dimmer monitoring unit decreases the reference signal, and the driver adjusts the driving signal to decrease the output current flowing through the light source.

4. The circuit as claimed in claim 1, wherein the light source comprises a first light-emitting component having a first color temperature level and a second light-emitting component having a second color temperature level, wherein the controller comprises a color temperature control unit for generating a first control signal and a second control signal based on the operation indicating signal, wherein the first control signal selectively turns on a first control switch coupled between the controller and the first light-emitting component so that the color temperature of the light source is adjusted to the first color temperature level, and wherein the second control signal selectively turns on a second control switch coupled between the controller and the second light-emitting component so that the color temperature of the light source is adjusted to the second color temperature level.

5. The circuit as claimed in claim 4, wherein the color temperature control unit comprises:
a timer operable for receiving the operation indicating signal, beginning timing when a falling edge of the operation indicating signal is detected, and generating a pulse signal after a predefined time interval;
a first D flip-flop operable for receiving the pulse signal; and
a second D flip-flop, coupled to the first D flip-flop, operable for receiving the operation indicating signal, wherein the first control signal and the second control signal are generated based on an output of the second D flip-flop.

6. The circuit as claimed in claim 1, wherein the controller comprises a judging unit operable for detecting a power status of the controller and generating a first judging signal and a second judging signal based on the power status of the controller, and wherein the controller adjusts the color temperature of the light source based on the first judging signal, the second judging signal, and the operation indicating signal.

7. The circuit as claimed in claim 1, wherein when the operation indicating signal indicates that a time period between a turn-off operation and the next turn-on operation of the ON/OFF switch following the turn-on operation is less than a predetermined time period, then the controller changes the color temperature of the light source from a first color temperature level to a second color temperature level in response to the following turn-on operation of the ON/OFF switch.

8. The circuit as claimed in claim 1, wherein when the operation indicating signal indicates that a time period between a turn-off operation and the next turn-on operation of the ON/OFF switch following the turn-on operation is greater than a predetermined time period, then the controller resets the color temperature of the light source to a default color temperature level in response to the following turn-on operation of the ON/OFF switch.

9. The circuit as claimed in claim 1, wherein the circuit includes a rectifier, and the power converter includes a transformer, wherein the transformer has a primary winding, a secondary winding, and an auxiliary winding, wherein the primary winding is coupled to the rectifier and operable for receiving power from the power source through the rectifier, wherein the secondary winding is operable for providing the regulated power to the light source, wherein the auxiliary winding is operable for providing power to the controller, and wherein the ON/OFF switch and the dimmer are coupled between the power source and the rectifier.

10. A controller for controlling color temperature of a light source, comprising:
a signal generator operable for generating a monitoring signal proportional to an output current flowing through the light source;
a dimmer monitoring unit operable for receiving a conduction status signal indicative of a conduction state of a dimmer coupled between a power source and a power converter, and for generating a reference signal indicative of a target level for the output current flowing through the light source based on the conduction status signal;
a driver, coupled to the signal generator and the dimmer monitoring unit, operable for generating a driving signal based on the monitoring signal and the reference signal to control the power converter to provide a regulated power to the light source; and
a color temperature control unit operable for receiving an operation indicating signal indicative of operation of an ON/OFF switch coupled to the dimmer, and for adjusting the color temperature of the light source based on the operation indicating signal.

11. The controller as claimed in claim 10, wherein the signal generator, the driver, and a transformer in the power converter constitute a negative feedback loop circuit that maintains the output current flowing through the light source at the target level.

12. The controller as claimed in claim 10, wherein the conduction status signal indicates a conduction angle of the dimmer, wherein when the conduction status signal indicates that the conduction angle is increased, then the dimmer monitoring unit increases the reference signal, and the driver adjusts the driving signal to increase the output current flowing through the light source, and wherein when the conduction status signal indicates that the conduction angle is decreased, then the dimmer monitoring unit decreases the reference signal, and the driver adjusts the driving signal to decrease the output current flowing through the light source.

13. The controller as claimed in claim 10, wherein the light source comprises a first light-emitting component having a first color temperature level and a second light-emitting component having a second color temperature level, wherein the color temperature control unit generates a first control signal and a second control signal based on the operation indicating signal, wherein the first control signal selectively turns on a first control switch coupled between the controller and the first light-emitting component so that the color temperature of the light source is adjusted to the first color temperature level, and wherein the second control signal selectively turns on a second control switch coupled between the controller and the second light-emitting component so that the color temperature of the light source is adjusted to the second color temperature level.

14. The controller as claimed in claim 13, wherein the color temperature control unit comprises:
a timer operable for receiving the operation indicating signal, beginning timing when the operation indicating signal has a falling edge, and generating a pulse signal after a predefined time interval;
a first D flip-flop operable for receiving the pulse signal; and
a second D flip-flop, coupled to the first D flip-flop, operable for receiving the operation indicating signal,
wherein the first control signal and the second control signal are generated based on an output of the second D flip-flop.

15. The controller as claimed in claim 10, wherein the controller comprises a judging unit operable for detecting a power status of the controller and generating a first judging signal and a second judging signal based on the power status of the controller, and wherein the controller adjusts the color temperature of the light source based on the first judging signal, the second judging signal, and the operation indicating signal.

16. The controller as claimed in claim 10, wherein when the operation indicating signal indicates that a time period between a turn-off operation and the next turn-on operation of the ON/OFF switch following the turn-on operation is less than a predetermined time period, then the controller changes the color temperature of the light source from a first color temperature level to a second color temperature level in response to the next turn-on operation of the ON/OFF switch.

17. The controller as claimed in claim 16, wherein the light source comprises a first light-emitting component having the first color temperature level and a second light-emitting component having the second color temperature level, wherein the controller generates a first control signal and a second control signal to adjust the color temperature of the light source based on the operation indicating signal, wherein the first control signal selectively turns on a first control switch coupled between the controller and the first light-emitting component so that a current flows through the light source and the color temperature of the light source is adjusted to the first color temperature level, and wherein the second control signal selectively turns on a second control switch coupled between the controller and the second light-emitting component so that a current flows through the light source and the color temperature of the light source is adjusted to the second color temperature level.

18. The controller as claimed in claim 10, wherein when the operation indicating signal indicates that a time period between a turn-off operation and the next turn-on operation of the ON/OFF switch following the turn-on operation is greater than a predetermined time period, then the controller resets the color temperature of the light source to a default color temperature level in response to the following turn-on operation of the ON/OFF switch.

\* \* \* \* \*